United States Patent
He

(10) Patent No.: US 6,697,561 B2
(45) Date of Patent: Feb. 24, 2004

(54) VARIABLE OPTICAL ATTENUATION COLLIMATOR

(75) Inventor: Yi He, Saratoga, CA (US)

(73) Assignee: Global Option, Inc., Santa Clara, CA (US)

( * ) Notice: Subject to any disclaimer, the term of this patent is extended or adjusted under 35 U.S.C. 154(b) by 103 days.

(21) Appl. No.: 10/078,197

(22) Filed: Feb. 15, 2002

(65) Prior Publication Data

US 2003/0156815 A1 Aug. 21, 2003

(51) Int. Cl.[7] .................. G02B 06/00; G02B 06/32; G02B 06/26
(52) U.S. Cl. ..................................... 385/140
(58) Field of Search .............. 385/140, 33–34; 359/641

(56) References Cited

U.S. PATENT DOCUMENTS 5,740,288 A * 4/1998 Pan ........................... 385/11
6,560,396 B1 * 5/2003 Yan et al. .................. 385/140
2003/0035605 A1 * 2/2003 Bouevitch et al. ............ 385/1

* cited by examiner

Primary Examiner—Edward J. Glick
Assistant Examiner—Krystyna Suchecki
(74) Attorney, Agent, or Firm—Pacific Law Group LLP; Chi Ping Chang

(57) ABSTRACT

A Variable Optical Attenuation Collimator (VOAC) is disclosed to achieve a variable degree of optical power attenuation through the collimator by adding an Attenuation Control Element (ACE) between a lens element and fiber pigtails of a traditional fiber optical collimator. The body of the ACE can be implemented in many different ways such as a polymer-network liquid crystal light scattering and absorbing material, a Refraction Index Gradient Controllable Material (RIGCM) capable of controllably swerving the direction of light propagation, a Refraction Index Controllable Material (RICM) capable of controllably defocusing an incident light power and a transparent Length Controllable Material (LCM) capable of controllably changing the spacing between the lens element and the fiber pigtails causing a defocusing of an incident light power.

17 Claims, 5 Drawing Sheets

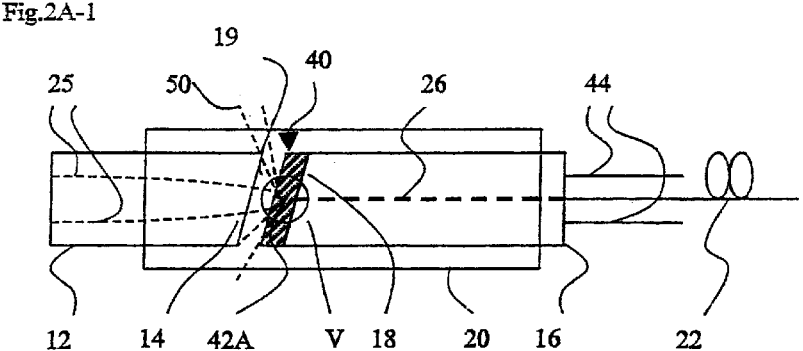
Fig.2A-1
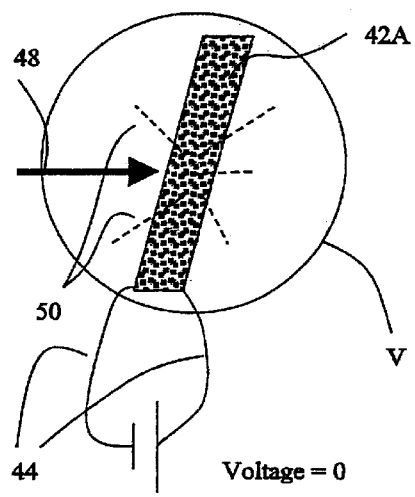
Fig.2A-2
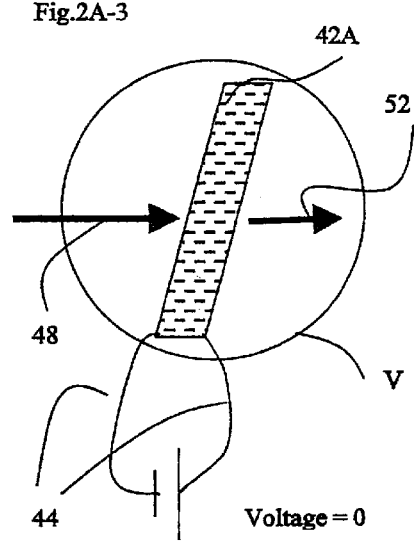
Fig.2A-3
Fig. 2A

Fig.2B-1
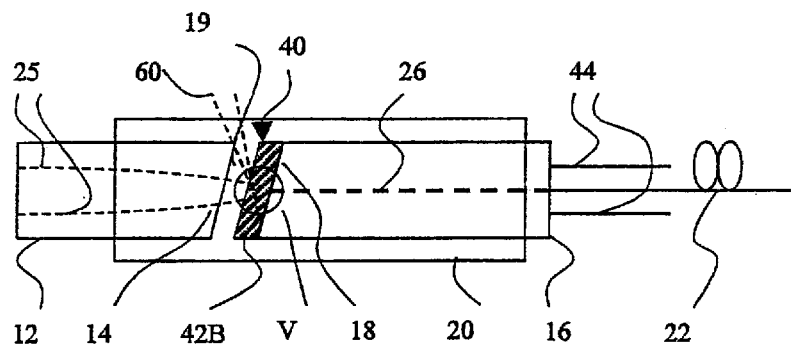
Fig.2B-2
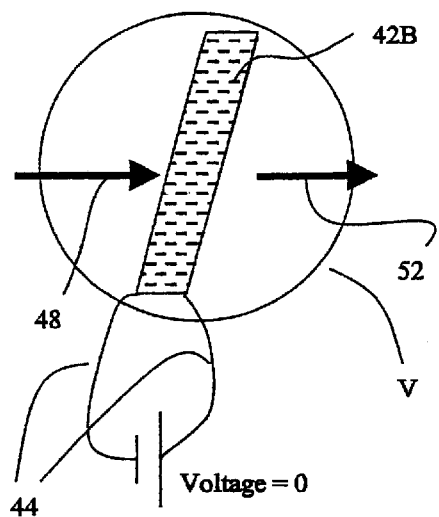
Fig.2B-3
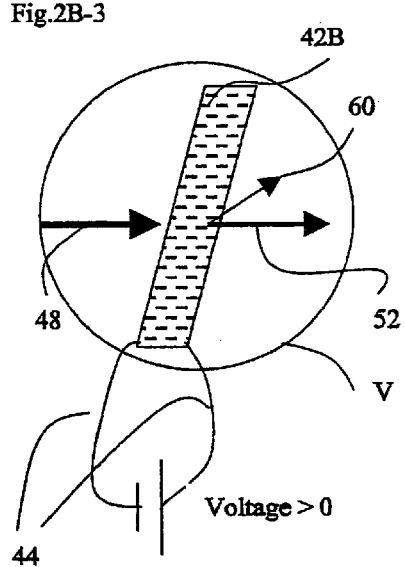
Fig. 2B

Fig. 2C-1
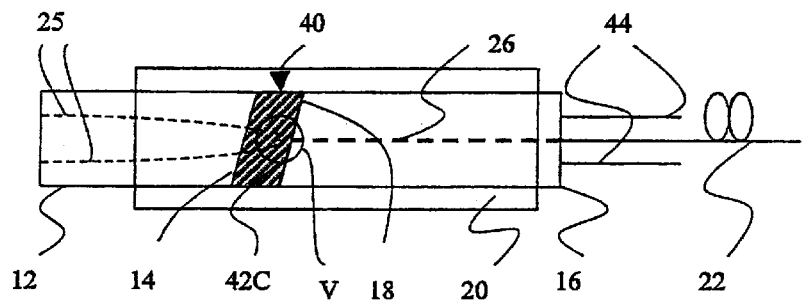
Fig. 2C-2
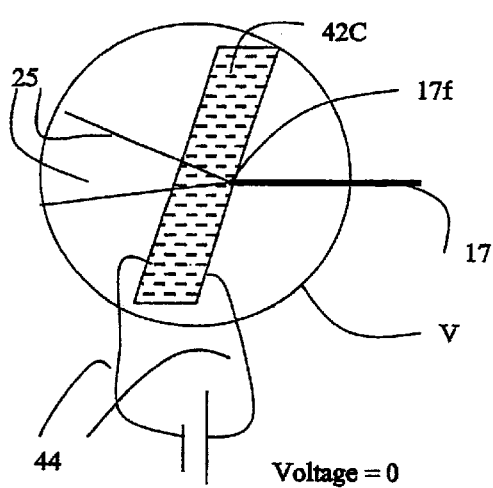
Fig. 2C-3
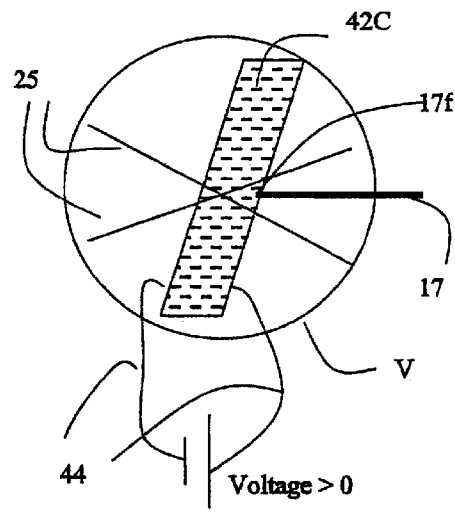
Fig. 2C

Fig.3-1
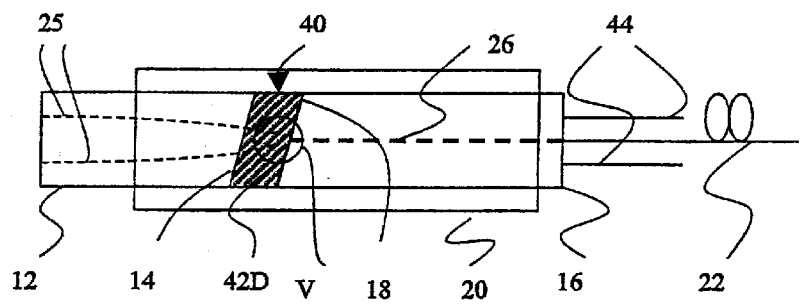
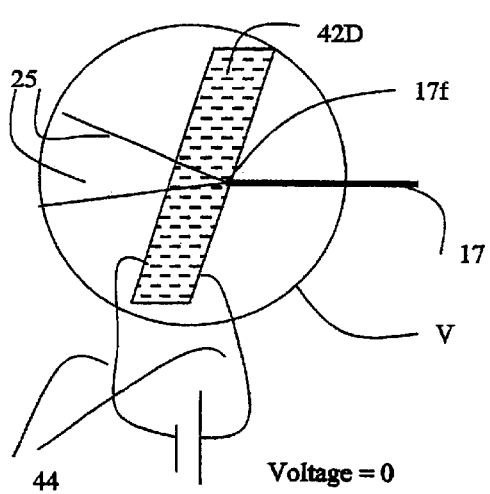
Fig.3-2
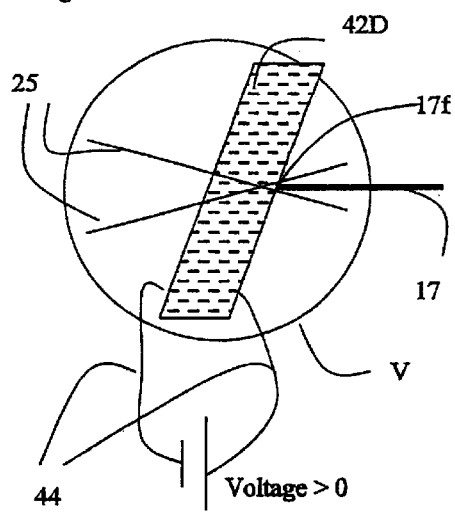
Fig.3-3
Fig. 3

VARIABLE OPTICAL ATTENUATION COLLIMATOR

FIELD OF THE INVENTION

The present invention relates generally to the field of fiber optical components used in fiber optical communications. More particularity, the present invention discloses a number of concepts for the designing and manufacturing of Variable Optical Attenuation Collimator (VOAC) so as to control the amount of light power propagating through a fiber optical collimator.

BACKGROUND OF THE INVENTION

The industry of fiber optical communications has already proven to be indispensable for the achievement of low noise, long distance telecommunication with a heretofore-unrealizable high bandwidth. Within a fiber optical network a Variable Optical Attenuator (VOA) is an important basic component with the function of controlling the propagated level of light power, such as a single-channel VOA or a VOA array. The VOA can be combined with other fiber optical components to form modules of a higher level of functionality, such as a Dense Wavelength Division Multiplexer (DWDM), an Optical Add/Drop Multiplexer (OADM) and a Programmable Optical Add/Drop Multiplexer (POADM). For example, in a DWDM, the optical power level of each channel is changed after it passes through Erbium-Doped Fiber optical Amplifiers (EDFAs) and associated fibers. In this case, a VOA is one of the simplest solutions to balancing the optical power level amongst the various wavelengths.

Recently, the need and the art of making the VOA has increased substantially due to the demand of real-time, dynamic light power management within a fiber optical system, especially as the market attention turns from long-haul systems toward metro-systems and even local networks and fiber delivery to individual homes.

However, to date, there has been a general lack of suitable VOA products in the market. For example, to meet the explosively growing traffic demand, a high channel-count transmission system will need to accommodate many VOAs in a compact package (the VOA array), which may cause many undesirable effects to the system including, but without limitation to, such problems as pigtail handling and VOA array set-up. To solve such problems commercially, the VOA or VOA array must feature a variety of properties such as small size, consistent and stable attenuation, short response time, very high reliability, easy-to-use while being low cost. Currently, there are three kinds of VOA or VOA array in the market, they are opto-mechanical VOA devices using stepper motor or magneto-optical crystal, VOA arrays based upon waveguide technology and VOAs or VOA arrays based upon MEMS-on-wafer technology where MEMS stands for Micro Electro Mechanical Structure. Unfortunately, none of these existing VOAs or VOA arrays can simultaneously realize all the aforementioned features. For example, while the opto-mechanical VOAs are capable of providing consistent and stable attenuation by using stepper motor or magneto-optic crystal to drive a shutter or light blocker into a light beam to obstruct part or all of the light power, they can not be minimized to meet the needs of high channel-count integration due to the bulky size of the stepper motor or the electro-magnetic coil. Essentially, the major drawbacks are their bulkiness, long response time, difficulty of system integration and high cost. On the other hand, the waveguide VOAs, while being suitable for high channel-count integration, are lack of consistent and stable attenuation expressed in the form of high insertion loss, high Polarization Dependent Loss (PDL), high Polarization Mode Dispersion (PMD) and sensitivity to ambient temperature. The temperature sensitivity is caused by a differential coefficient of temperature change of the refractive index between the waveguide material and an attached glass fiber core. Additionally, there is difficulty of system integration in the sense that it is difficult to couple light into and out of the ends of the waveguide due to mode difference of the propagating light between the waveguide and an attached fiber. The drawbacks of the MEMS VOA are similar to that of the waveguide VOA. The MEMS VOA usually leaves a narrow air gap between two fiber ends to allow the insertion of a MEMS shutter into the light path. While the MEMS VOA is suitable for assembly into an array by placing the fibers and shutters onto a MEMS wafer, the associated insertion loss, return loss and temperature dependence can not be easily perfected due to the presence of this air gap and the requirement of maintaining parallelism between the end surfaces of the fibers.

SUMMARY

The present invention is directed to a concept of designing and manufacturing VOAC with the inclusion of an Attenuation Control Element (ACE) to perform the function of the aforementioned VOA or VOA arrays while featuring small size, consistent and stable attenuation, short response time, very high reliability, easy-to-use and low cost.

The first objective of this invention is to provide for a VOAC that achieves a consistent and stable attenuation.

The second objective of this invention is to provide for a VOAC that is compact in size.

The third objective of this invention is to provide for a VOAC that achieves a short response time.

The fourth objective of this invention is to provide for a VOAC that is low cost.

Other objectives, together with the foregoing are attained in the exercise of the invention in the following description and resulting in the embodiment illustrated in the accompanying drawings.

BRIEF DESCRIPTION OF DRAWINGS

The current invention will be better understood and the nature of the objectives set forth above will become apparent when consideration is given to the following detailed description of the preferred embodiments. For clarity of explanation, the detailed description further makes reference to the attached drawings herein:

FIG. 2A illustrates a first embodiment of the design of ACE;

FIG. 2B illustrates a second embodiment of the design of ACE;

FIG. 2C illustrates a third embodiment of the design of ACE; and

FIG. 3 illustrates a fourth embodiment of the design of ACE that causes a variable spacing between a lens element and fiber pigtails of a traditional multi-fiber optical collimator.

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessary obscuring aspects of the present invention.

Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
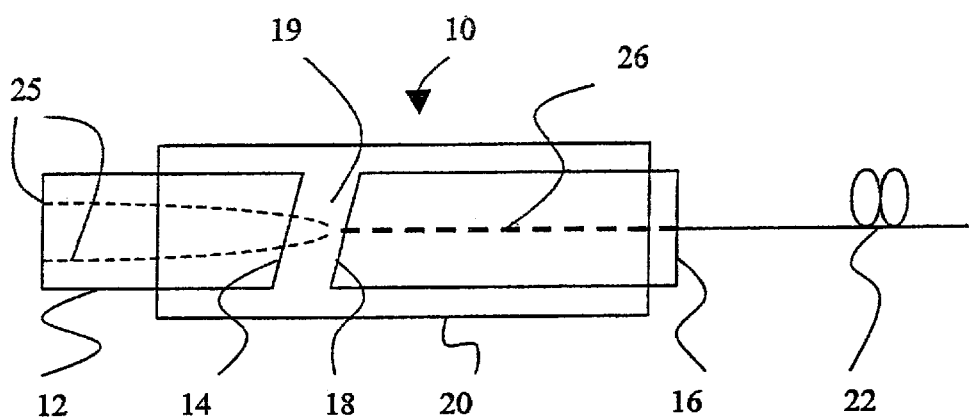
FIG. 1A illustrates a structure of a traditional multi-fiber optical collimator.

FIG. 1A illustrates a structure of a traditional multi-fiber optical collimator 10. The traditional multi-fiber optical collimator 10 comprises a lens 12 separated from a pigtail 16 with an air gap 19. The lens 12 and the pigtail 16 are affixed to a common housing tube 20. The right end of the pigtail 16 is attached to a fiber assembly 22 containing one or more optical fibers. Typically, as is well known in the art, the lens 12 is made of an appropriate GRaded INdex of refraction (GRIN) lens whereby a laser light entering the left end of the lens 12 is automatically focused onto the proper entry point of the pigtail 16 for further propagation along the pigtail 16 with minimum light loss. This is illustrated with an intra-lens light path 25 and an intra-pigtail light path 26. Finally, the light enters the fiber assembly 22 from the right end of the pigtail 16 for further propagation. Notice that, as is also well known in the art, both the lens 12 and the pigtail 16 have tilted, with respect to the optical axis, yet parallel to each other surfaces for the maximization of return loss. These are tilted lens surface 14 and tilted pigtail surface 18 respectively. From optical reciprocity, another situation wherein the light enters the traditional multi-fiber optical collimator 10 from its right end of fiber assembly 22 works just as well.

Figure 1B:
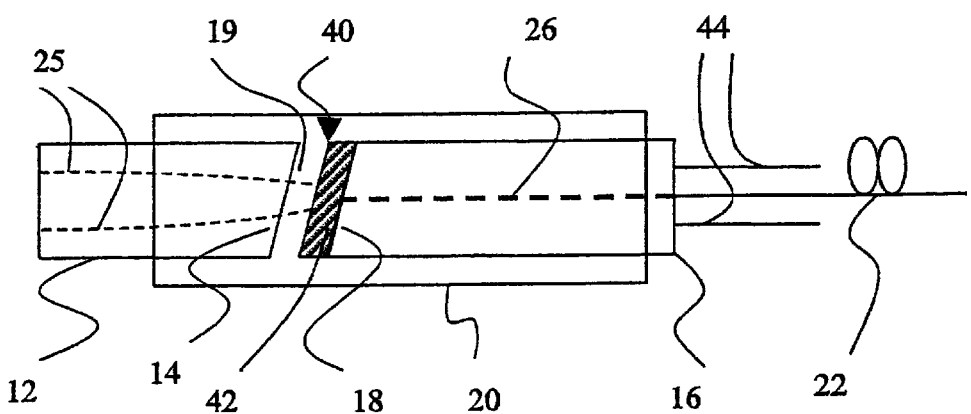
FIG. 1B illustrates a structure of a multi-fiber optical collimator of the present invention with the inclusion of the ACE.

FIG. 1B illustrates a structure of a multi-fiber optical collimator of the present invention with the addition, within the existing air gap 19, of an ACE 40 comprising a ACE body 42 and ACE control electrodes 44 attached to the ACE body 42. Although the attachment, being blocked from view by the pigtail 16, is not directly visible. Otherwise, the rest of the structure of the present invention is the same as that of the traditional multi-fiber optical collimator 10. Functionally, as will be presently illustrated, the ACE body 42 causes a predetermined amount of light attenuation through it with the amount of light attenuation further controlled with control signals applied through the ACE control electrodes 44 to realize the function of a VOAC. As the ACE 40 is added in the existing air gap 19 of the traditional multi-fiber optical collimator 10, there is no incremental size impact on the collimator resulting in a very compact VOAC.

FIG. 2A, consisting of sub-figures FIG. 2A-1, FIG. 2A-2 and FIG. 2A-3, illustrates a first embodiment of the design of the ACE 40 where, in FIG. 2A-1, an ACE polymer-network liquid crystal body 42A is attached to the tilted pigtail surface 18 within the air gap 19. The polymer-network liquid crystal material is known in the art. When there is no external voltage applied across the ACE polymer-network liquid crystal body 42A, a propagating light beam through the ACE polymer-network liquid crystal body 42A is scattered due to the refractive index mismatching between the liquid crystal and the polymer. However, when an external voltage is applied, the propagating light beam can pass through ACE polymer-network liquid crystal body 42A due to a resulting matched refractive index between the liquid crystal and the polymer. Furthermore, the degree of refractive index matching is proportional to the external driving voltage. In addition, if the thickness of the ACE polymer-network liquid crystal body 42A is thin enough, a low external voltage of only a few volts will be enough to effect a low residual light power loss due to scattering. For example, a material known by the trade name of PNM-X developed by Dainippon Ink & Chemicals Company of Japan can be used as the ACE polymer-network liquid crystal body 42A. For clarity of illustration, a circled view area V is marked in FIG. 2A-1. Notice the appearance of scattered lights 50 from the view area V that is enlarged in FIG. 2A-2 and FIG. 2A-3. FIG. 2A-2 illustrates that, due to the mismatching of refractive indices between the liquid crystal material and the polymer-network within the ACE polymer-network liquid crystal body 42A, part or all of the light power of an incident light beam 48 is scattered away from the main light path into a form of scattered lights 50, resulting in a desired optical power attenuation that is approximately proportional to the degree of refractive index mismatching. The remaining transmitted light power is illustrated with transmitted lights 52 in FIG. 2A-3. Therefore, given the property of the ACE polymer-network liquid crystal body 42A just described, the degree of optical power attenuation through the ACE 40 is controlled by a voltage signal applied at the ACE control electrodes 44 as required by a VOAC. With the ACE polymer-network liquid crystal body 42A capable of being made as thin as 40 $\mu$m (micron), the corresponding response cycle time can become as fast as 40 ms/cycle (milliseconds per cycle). An additional advantage is that the ACE polymer-network liquid crystal body 42A only consumes a small amount of operating power, less than 0.5 $\mu$W (microwatts).

FIG. 2B, consisting of sub-figures FIG. 2B-1, FIG. 2B-2 and FIG. 2B-3, illustrates a second embodiment of the design of the ACE 40 where, in FIG. 2B-1, an ACE Refraction Index Gradient Controllable Material (RIGCM) body 42B is attached to the tilted pigtail surface 18 within the air gap 19. Many RIGCM materials are available in the art. For example, a refraction index gradient can be generated within a polymeric material with a temperature gradient. Also, a grating-like refraction index distribution can be generated within a Lithium Niobate crystal under stimulation with acoustic waves. The ACE RIGCM body 42B has the property that, when there is no voltage applied between the ACE control electrodes 44, light power can pass through the ACE RIGCM body 42B along its main optical path with essentially no optical power attenuation. However, under an applied voltage between the ACE control electrodes 44, a corresponding amount of refractive index gradient along a direction parallel to the tilted pigtail surface 18 is generated within the ACE RIGCM body 42B, causing part or all of the light power to be swerved away from the main optical path to generate a resulting amount of optical power attenuation. Furthermore, the generated amount of refractive index gradient corresponds to the resulting amount of optical power attenuation. For clarity of illustration, a circled view area V is marked in FIG. 2B-1. Notice the appearance of swerved lights 60 from the view area V that is enlarged in FIG. 2B-2 and FIG. 2B-3. Thus, in FIG. 2B-2, when there is no voltage applied between the ACE control electrodes 44 there is essentially no optical power attenuation through the ACE RIGCM body 42B and the magnitude of an incident light beam 48 is shown as approximately equal to the magnitude of transmitted lights 52. However, under an applied voltage between the ACE control electrodes 44 in FIG. 2B-3, a corresponding amount of swerved lights 60 are swerved away from the main optical path leaving an amount of remaining transmitted lights 52 lower in magnitude than that of the incident light beam 48. Therefore, the degree of optical power attenuation through the ACE 40 is controlled by a voltage signal applied at the ACE control electrodes 44 as required by a VOAC. As there is no moving part within the ACE RIGCM body 42B, a very high service reliability with consistent and stable attenuation can be realized. Additionally, an ACE RIGCM body 42B made of the Lithium Niobate crystal can reach a very fast response time of as short as 0.2 μs (microseconds).

FIG. 2C, consisting of sub-figures FIG. 2C-1, FIG. 2C-2 and FIG. 2C-3, illustrates a third embodiment of the design of the ACE 40 where, in FIG. 2C-1, an ACE Refraction Index Controllable Material (RICM) body 42C is attached to the tilted pigtail surface 18 and filling up the air gap 19. For example, the refraction index of many polymeric materials generally changes with the temperature. The ACE RICM body 42C has the property that, when there is an applied voltage between the ACE control electrodes 44, a corresponding amount of change in refractive index is generated within the ACE RICM body 42C causing a corresponding change of the optical path length between the tilted lens surface 14 and the tilted pigtail surface 18. For clarity of illustration, a circled view area V is marked in FIG. 2C-1 that is enlarged in FIG. 2C-2 and FIG. 2C-3. Thus, in FIG. 2C-2, when there is no voltage applied between the ACE control electrodes 44 the optical path length between the tilted lens surface 14 and the tilted pigtail surface 18 is proper for the lens 12 to focus the light power accurately onto a fiber pigtail core focal point 17f for further transmission through a fiber pigtail core 17 and there is essentially no optical power attenuation through the ACE RICM body 42C. However, under an applied voltage between the ACE control electrodes 44 in FIG. 2C-3, the optical path length between the tilted lens surface 14 and the tilted pigtail surface 18 undergoes a corresponding change and is no longer proper for the lens 12 to focus the light power accurately onto the fiber pigtail core focal point 17f. That is, as illustrated, part of the light power is no longer focused into the fiber pigtail core for further transmission, resulting in a corresponding optical power attenuation. Therefore, the degree of optical power attenuation through the ACE 40 is controlled by a voltage signal applied at the ACE control electrodes 44 as required by a VOAC. As the polymeric material for the ACE RICM body 42C is very low in cost and the process of filling the air gap 19 with the polymeric material is relatively simple, this embodiment of the design of the ACE 40 features the advantage of very low cost.

FIG. 3 illustrates a fourth embodiment of the design of ACE that causes a variable spacing between a lens element and fiber pigtails of a traditional multi-fiber optical collimator.

FIG. 3, consisting of sub-figures FIG. 3-1, FIG. 3-2 and FIG. 3-3, illustrates a fourth embodiment of the design of ACE 40 that causes a variable spacing between a lens element 12 and fiber pigtails 16 of a traditional multi-fiber optical collimator. In FIG. 3-1, an ACE Length Controllable Material (LCM) body 42D, being transparent to a propagating light, is disposed between and attached to both the tilted lens surface 14 and the tilted pigtail surface 18. Any material in the art having a high thermo-expansion coefficient can be used as the ACE LCM body 42D. Thus, the ACE LCM body 42D has the property that, when there is an externally applied voltage between the ACE control electrodes 44, a corresponding amount of change in length is generated within the ACE LCM body 42D which equals to a corresponding change of the optical path length between the tilted lens surface 14 and the tilted pigtail surface 18. For clarity of illustration, a circled view area V is marked in FIG. 3-1 that is enlarged in FIG. 3-2 and FIG. 3-3. Thus, in FIG. 3-2, when there is no voltage (Voltage=0) applied between the ACE control electrodes 44 the optical path length between the tilted lens surface 14 and the tilted pigtail surface 18 is proper for the lens 12 to focus the light power accurately onto a fiber pigtail core focal point 17f for further transmission through a fiber pigtail core 17 and there is essentially no optical power attenuation through the ACE LCM body 42D. However, under an applied voltage (Voltage>0) between the ACE control electrodes 44 in FIG. 3-3, the optical path length between the tilted lens surface 14 and the tilted pigtail surface 18 undergoes a corresponding change and is no longer proper for the lens 12 to focus the light power accurately onto the fiber pigtail core focal point 17f. That is, as illustrated, part of the light power is no longer focused into the fiber pigtail core for further transmission resulting in a corresponding optical power attenuation. Therefore, the degree of optical power attenuation through the ACE 40 is controlled by a voltage signal applied between the ACE control electrodes 44 as required by a VOAC. Thus, the fourth embodiment of the design of ACE 40 features a simplicity of design and is also very low cost. As an overall remark, all the aforementioned exemplary designs (FIG. 1B, FIG. 2A, FIG. 2B, FIG. 2C and FIG. 3) package the ACE 40 in a traditional fiber optical collimator that has been adopted in 80% of the fiber optical devices and modules in the market. Therefore it is obvious that the VOAC of the present invention can be easily installed and are easy to use. Furthermore, the exemplary design with a polymer-network liquid crystal body (FIG. 2A) features very low electric power consumption and a short response time, but the associated manufacturing process is a little more complex. The exemplary designs as shown in FIG. 2C and FIG. 3 can realize very good specifications of optical performance with a lower manufacturing cost while their drawbacks, comparing with that of FIG. 2A, are their longer response time. As for the embodiment shown in FIG. 2B, the manufacturing cost is higher and the operating voltage may also be higher.

As described with four exemplary cases of design, a Variable Optical Attenuation Collimator with the inclusion of an Attenuation Control Element is disclosed to perform the function of a Variable Optical Attenuator or Variable Optical Attenuator arrays while featuring many additional advantages. The invention has been described using exemplary preferred embodiments. However, for those skilled in this field, the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

What is claimed are the following:

1. A multi-fiber, Variable Optical Attenuation Collimator (VOAC) for providing a variable degree of optical power attenuation to a light beam propagating therethrough, comprising:

a lens and a pigtail separated by an air gap wherein the lens and the pigtail is affixed to a common housing tube in such a manner that the light beam entering at a left end of the lens is automatically focused onto a proper entry point of the pigtail for further propagation along the pigtail;

a fiber assembly containing one or more optical fibers attached to a right end of the pigtail; and an Attenuation Control Element (ACE) disposed thereto within the air gap so as to cause a variable degree of optical power attenuation to the light beam entering the fiber assembly from the pigtail.

2. The multi-fiber VOAC of claim 1 wherein the ACE further comprises an ACE body and ACE control electrodes connected to the ACE body whereby the ACE body causes a predetermined amount of light attenuation through it with the amount of light attenuation further controlled by control signals generated from an external voltage applied through the ACE control electrodes to realize a controllable degree of optical power attenuation.

3. The multi-fiber VOAC of claim 2 wherein the ACE body is a polymer-network liquid crystal light scattering and absorbing material.

4. The multi-fiber VOAC of claim 2 wherein the ACE body is a Refraction Index Gradient Controllable Material (RIGCM) capable of controllably swerving the direction of light propagation.

5. The multi-fiber VOAC of claim 2 wherein the ACE body is a Refraction Index Controllable Material (RICM) capable of controllably defocusing an incident light power.

6. The multi-fiber VOAC of claim 2 wherein the ACE body is a transparent Length Controllable Material (LCM) capable of controllably changing the spacing between the lens and the pigtail, resulting in a defocusing of an incident light power.

7. An Attenuation Control Element (ACE) for providing a variable degree of optical power attenuation to a light beam propagating through a multi-fiber, Variable Optical Attenuation Collimator (VOAC) that comprises a lens, a pigtail and a fiber assembly containing one or more optical fibers wherein the lens and the pigtail is affixed to a common housing tube and is separated by an air in such a manner that the light beam entering at a left end of the lens is automatically focused onto a proper entry point of the pigtail for further propagation along the pigtail to the fiber assembly, the ACE comprising:

an ACE body disposed thereto within the air gap to cause a predetermined amount of light attenuation through; and an ACE control electrodes connected to the ACE body to provide control signals applied through an external voltage to the ACE body to cause a variable degree of optical power attenuation to the light beam entering the fiber assembly from the pigtail.

8. The ACE of claim 7 wherein the ACE body is a polymer-network liquid crystal light scattering and absorbing material.

9. The ACE of claim 7 wherein the ACE body is a Refraction Index Gradient Controllable Material (RIGCM) capable of controllably swerving the direction of light propagation.

10. The ACE of claim 7 wherein the ACE body is a Refraction Index Controllable Material (RICM) capable of controllably defocusing an incident light power.

11. The ACE of claim 7 wherein the ACE body is a transparent Length Controllable Material (LCM) capable of controllably changing the spacing between the lens and the pigtail, resulting in a defocusing of an incident light power.

12. A method of making a multi-fiber, Variable Optical Attenuation Collimator (VOAC) for providing a variable degree of optical power attenuation to a light beam propagating therethrough, comprising the steps of:

providing a lens and a pigtail separated by an air gap wherein the lens and the pigtail is affixed to a common housing tube in such a manner that the light beam entering at a left end of the lens is automatically focused onto a proper entry point of the pigtail for further propagation along the pigtail;

attaching a fiber assembly containing one or more optical fibers to a right end of the pigtail; and disposing an Attenuation Control Element (ACE) within the air gap so as to cause a variable degree of optical power attenuation to the light beam entering the fiber assembly from the pigtail.

13. The method of making a multi-fiber VOAC of claim 12 further comprises the step of providing an ACE body and an ACE control to the ACE wherein the ACE electrodes is connected to the ACE body such that the ACE body causes a predetermined amount of light attenuation through it with the amount of light attenuation further controlled by control signals generated from an external voltage applied through the ACE control electrodes to realize a controllable degree of optical power attenuation.

14. The method of making a multi-fiber VOAC of claim 13 wherein the ACE body is a polymer-network liquid crystal light scattering and absorbing material.

15. The method of making a multi-fiber VOAC of claim 13 wherein the ACE body is a Refraction Index Gradient Controllable Material (RIGCM) capable of controllably swerving the direction of light propagation.

16. The method of making a multi-fiber VOAC of claim 13 wherein the ACE body is a Refraction Index Controllable Material (RICM) capable of controllably defocusing an incident light power.

17. The method of making a multi-fiber VOAC of claim 13 wherein the ACE body is a transparent Length Controllable Material (LCM) capable of controllably changing the spacing between the lens and the pigtail, resulting in a defocusing of an incident light power.

* * * * *